(12) United States Patent
Toda (10) Patent No.: US 8,891,865 B2
(45) Date of Patent: Nov. 18, 2014

(54) IMAGE PROCESSING DEVICE, IMAGE PROCESSING METHOD, AND STORAGE MEDIUM FOR PERFORMING A GRADATION CORRECTION OPERATION IN A COLOR SPACE

(75) Inventor: Masato Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 519 days.

(21) Appl. No.: 13/142,211

(22) PCT Filed: Dec. 17, 2009

(86) PCT No.: PCT/JP2009/006951
§ 371 (c)(1),
(2), (4) Date: Jun. 24, 2011

(87) PCT Pub. No.: WO2010/073553
PCT Pub. Date: Jul. 1, 2010

(65) Prior Publication Data
US 2011/0293178 A1    Dec. 1, 2011

(30) Foreign Application Priority Data
Dec. 26, 2008    (JP) ................... 2008-334911

(51) Int. Cl.
| G06K 9/00 | (2006.01) |
| G06K 9/40 | (2006.01) |
| G03F 3/08 | (2006.01) |
| H04N 5/57 | (2006.01) |
| H04N 21/431 | (2011.01) |
| H04N 21/44 | (2011.01) |
| H04N 9/68 | (2006.01) |
| H04N 9/77 | (2006.01) |

(52) U.S. Cl.
CPC . *H04N 9/77* (2013.01); *H04N 5/57* (2013.01); *H04N 21/4318* (2013.01); *H04N 21/44008* (2013.01); *H04N 9/68* (2013.01)

USPC ............ 382/167; 382/274; 358/520; 358/521

(58) Field of Classification Search
USPC .................. 382/162, 167, 274; 348/254–256; 358/461, 518–523
See application file for complete search history.

(56) References Cited

U.S. PATENT DOCUMENTS

| 4,831,434 A | 5/1989 | Fuchsberger | |
| 5,351,141 A * | 9/1994 | Tsuji et al. | 358/520 |

(Continued)

FOREIGN PATENT DOCUMENTS

| JP | 3-055078 B2 | 3/1988 |
| JP | 03-201697 A | 9/1991 |

(Continued)

OTHER PUBLICATIONS

Akyuz et al. ("Color appearance in high-dynamic-range imaging," J. Electron. Imaging. 15(3), 033001, Sep. 15, 2006).*

(Continued)

*Primary Examiner* — Yubin Hung
(74) *Attorney, Agent, or Firm* — Sughrue Mion, PLLC (57) ABSTRACT

An image processing device (100) includes a gradation correction value acquiring unit (12) that acquires a gradation correction value representing a ratio of a luminance component of an input image and a luminance component of an output image, a chroma analyzing unit (13) that calculates a chroma correction value, in which the total sum of degrees of chroma discrepancy between an analysis image equal to or different from the input image and a corrected image obtained by correcting a luminance component of the analysis image on the basis of one or more gradation correction values is the minimum, in correspondence with the gradation correction value, and an image output unit (14) that outputs as the output image an image obtained by correcting the input image received by the image input unit (11) on the basis of the gradation correction value acquired by the gradation correction value acquiring unit (12) and the chroma correction value correlated with the gradation correction value.

9 Claims, 8 Drawing Sheets

(56) References Cited

U.S. PATENT DOCUMENTS

| | | | |
|---|---|---|---|
| 5,489,998 A * | 2/1996 | Yamada et al. | 358/523 |
| 5,661,575 A | 8/1997 | Yamashita et al. | |
| 6,101,271 A | 8/2000 | Yamashita et al. | |
| 6,198,841 B1 * | 3/2001 | Toyama et al. | 382/164 |
| 6,781,595 B2 | 8/2004 | Kobayashi et al. | |
| 2001/0014174 A1 * | 8/2001 | Yamamoto | 382/167 |
| 2002/0171663 A1 * | 11/2002 | Kobayashi et al. | 345/600 |
| 2004/0202365 A1 * | 10/2004 | Spaulding et al. | 382/162 |
| 2007/0222728 A1 | 9/2007 | Koyama et al. | |
| 2007/0242897 A1 * | 10/2007 | Bushell et al. | 382/274 |
| 2008/0317340 A1 * | 12/2008 | Ahn et al. | 382/167 |
| 2009/0251745 A1 * | 10/2009 | Wang et al. | 358/509 |

FOREIGN PATENT DOCUMENTS

| | | |
|---|---|---|
| JP | 2748678 A | 5/1992 |
| JP | 11-252584 A | 9/1999 |
| JP | 2002-204373 A | 7/2002 |
| JP | 2003-162715 A | 6/2003 |
| JP | 2004-336656 A | 11/2004 |
| JP | 2006-018465 | 1/2006 |
| JP | 2006-318255 A | 11/2006 |
| JP | 2007-142500 A | 6/2007 |
| JP | 2007-259242 A | 10/2007 |
| WO | 2006/025486 A1 | 3/2006 |

OTHER PUBLICATIONS

Korean Office Action issued on Aug. 9, 2012 by the Korean Patent Office corresponding to Korean Application No. 1020117014719.

* cited by examiner

IMAGE PROCESSING DEVICE, IMAGE PROCESSING METHOD, AND STORAGE MEDIUM FOR PERFORMING A GRADATION CORRECTION OPERATION IN A COLOR SPACE

CROSS REFERENCE TO RELATED APPLICATIONS

This application is a National Stage of International Application No. PCT/JP2009/006951 filed Dec. 17, 2009, claiming priority based on Japanese Patent Application No. 2008-334911 filed Dec. 26, 2008, the contents of all of which are incorporated herein by reference in their entirety.

TECHNICAL FIELD

The present invention relates to an image processing device, an image processing method, and a storage medium, and more particularly, to an image processing device which can perform a gradation correcting operation in a color space such as a YUV color space or a YCrCb color space expressed by a luminance component and a chrominance component, an image processing method, and a storage medium storing a program thereof.

BACKGROUND ART

In videos used for television broadcasts, DVDS, or the like or images such as JPEG, a color space such as a YUV color space or a YCrCb color space expressed by a luminance component and a chrominance component is used.

The gradation correction (The tone correction) of the videos or images in the color space expressed by the luminance component and the chrominance component is advantageous in view of calculation cost, because a transformation process and an inverse transformation process into other color spaces are unnecessary.

In recent years, apparatuses performing a gradation correcting operation at the time of capturing or displaying videos or images have been appearing increasingly. Since such apparatuses need to perform the gradation correction of videos or images in real time while suppressing the calculation cost, there has increased a need for a high-performance gradation correction in a color space such as a YUV color space or a YCrCb color space expressed by a luminance component and a chrominance component, which makes unnecessary the calculation cost for the transformation and inverse transformation processes into other color spaces.

The YUV (YCrCb) color space includes the luminance component (Y component) representing brightness and the chrominance component (a U component and a V component, or a Cr component and a Cb component) representing a color tone and the gradation in the YUV color space can be corrected by correcting the Y component. However, since there is a gap between axes in the YUV color space and a brightness or color tone axis recognizable to humans, there is a problem in that the visual saturation (chroma) deteriorates as a result of changing the Y component.

To solve the above-mentioned problem, various image processing devices or image processing methods have been proposed.

For example, in the technique described in Patent Document 1, a correction amount of a pixel of interest is determined on the basis of a weighted average luminance value of a local area around the pixel of interest, whereby it is possible to appropriately correct the gradation of a highlighted area or a shadowed area included in an image.

In the technique described in Patent Document 2, a gradation correction value is adjusted on the basis of average luminance of an area determined as a face in an image, whereby it is possible to set the brightness of a person's face, which is most emphasized at the time of viewing an image, to the optimal brightness.

In the technique described in Patent Document 3, a ratio of $Y_{in}(x, y)$ representing a non-corrected Y component value and $Y_{out}(x, y)$ representing a corrected Y component value at a pixel position (x, y) is multiplied by a U component value and a V component value, thereby suppressing the deterioration in visual saturation. This correction can be expressed by Expression 1.

$$Uout(x, y) = \left(\frac{Yout(x, y)}{Yin(x, y)}\right) Uin(x, y) \quad \text{Expression 1}$$

$$Vout(x, y) = \left(\frac{Yout(x, y)}{Yin(x, y)}\right) Vin(x, y)$$

In Expression 1, $U_{in}(x, y)$, $U_{out}(x, y)$, $V_{in}(x, y)$, and $V_{out}(x, y)$ represent U components and V components before and after the correction at the pixel position (x, y).

In the technique described in Patent Document 4, the relation between a ratio of Y values before and after correction in YCrCb values and a ratio of chroma in the YCrCb color space before and after the correction when a* component and b* component are maintained in a CIE L*a*b* color space is calculated by linear approximation and the Cr component and the Cb component are corrected on the basis thereon. This correction can be applied to the YUV color space. In this case, the correction can be expressed by Expression 2.

$$Uout(x, y) = \left(\frac{Yout(x, y)}{Yin(x, y)} \times p + 1 - p\right) Uin(x, y) \quad \text{Expression 2}$$

$$Vout(x, y) = \left(\frac{Yout(x, y)}{Yin(x, y)} \times p + 1 - p\right) Vin(x, y)$$

In Expression 2, p represents the value of the relation between $Y_{out}(x, y)/Y_{in}(x, y)$ and the ratio of the U component or the ratio of the V component before and after the correction by estimating the relation by the use of the linear approximation. By setting p=1, Expression 2 becomes equal to Expression 1.

[Patent Document 1] WO 2006/025486
[Patent Document 2] JP-A-2006-318255
[Patent Document 3] JP-A-2007-142500
[Patent Document 4] JP-A-2006-018465

DISCLOSURE OF THE INVENTION

The above-mentioned technique is designed to maintain the saturation (chroma) of colors recognizable to humans by correcting the chrominance component (the U component and the V component) in addition to the luminance component (the Y component). However, since the correlation between the correction value of the luminance component (gradation correction value) and the correction value of the chrominance component (chroma correction value) is not satisfactorily analyzed, there are cases where local errors between actual values and approximate values are great.

The invention is made in consideration of the above-mentioned circumstances. A goal of the invention is to provide an image processing device, an image processing method, and a storage medium, which can appropriately correct the chroma at the time of correcting the gradation of an image expressed by a luminance component and a chrominance component.

According to the invention, there is provided an image processing device including: an image input unit that receives an input image; a gradation correction value acquiring unit that acquires a gradation correction value representing a ratio of a luminance component of the input image and a luminance component of an output image; a chroma analyzing unit that calculates a chroma correction value, in which the total sum of degrees of chroma discrepancy between an analysis image equal to or different from the input image and a corrected image obtained by correcting a luminance component of the analysis image on the basis of one or more gradation correction values is the minimum, in correspondence with the gradation correction value; and an image output unit that outputs as the output image an image obtained by correcting the input image received by the image input unit on the basis of the gradation correction value acquired by the gradation correction value acquiring unit and the chroma correction value correlated with the gradation correction value.

According to the invention, there is also provided an image processing method including: receiving an input image; acquiring a gradation correction value representing a ratio of a luminance component of the input image and a luminance component of an output image; calculating a chroma correction value, in which the total sum of degrees of chroma discrepancy between an analysis image equal to or different from the input image and a corrected image obtained by correcting a luminance component of the analysis image on the basis of one or more gradation correction values is the minimum, in correspondence with the gradation correction value; and outputting as the output image an image obtained by correcting the input image received in the receiving the input image on the basis of the gradation correction value acquired in the acquiring the gradation correction value and the chroma correction value correlated with the gradation correction value.

According to the invention, there is provided a computer-readable storage medium having stored thereon a program allowing a computer to execute: an image input process of receiving an input image; a gradation correction value acquiring process of acquiring a gradation correction value representing a ratio of a luminance component of the input image and a luminance component of an output image; a chroma analyzing process of calculating a chroma correction value, in which the total sum of degrees of chroma discrepancy between an analysis image equal to or different from the input image and a corrected image obtained by correcting a luminance component of the analysis image on the basis of one or more gradation correction values is the minimum, in correspondence with the gradation correction value; and an image output process of outputting as the output image an image obtained by correcting the input image received in the image input process on the basis of the gradation correction value acquired in the gradation correction value acquiring process and the chroma correction value correlated with the gradation correction value.

According to the invention, it is possible to calculate the chroma correction value corresponding to a specific gradation correction value, by analyzing the analysis image and the corrected image obtained by correcting the analysis image on the basis of the specific gradation correction value. Accordingly, it is possible to correct the chroma with relatively high accuracy.

According to the invention, it is possible to provide an image processing device, an image processing method, and a program, which can appropriately correct the chroma in correcting the gradation of an image expressed by a luminance component and a chrominance component.

BRIEF DESCRIPTION OF THE DRAWINGS

The above-mentioned goal and other goals, features, and advantages will be apparent with reference to the following preferred embodiments and the accompanying drawings.

BEST MODE FOR CARRYING OUT THE INVENTION

Hereinafter, embodiments of the invention will be described with reference to the accompanying drawings. In all the drawings, like elements are referenced by like reference signs and description thereof will not be repeated.

First Embodiment

Figure 1:
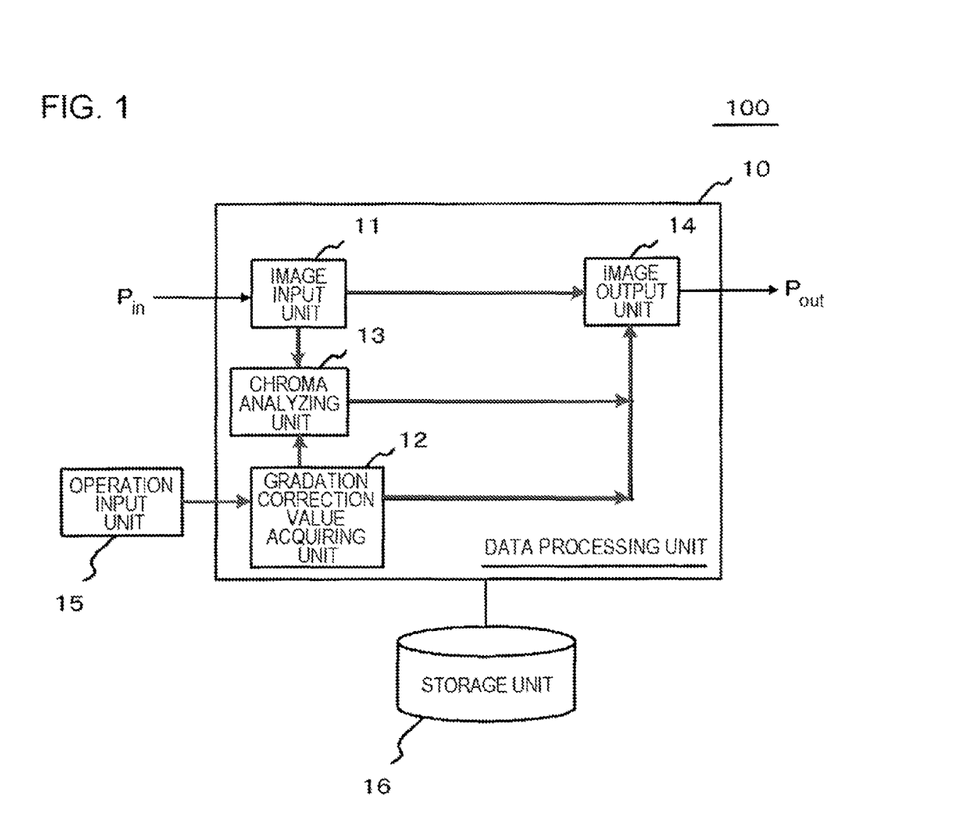
FIG. 1 is a diagram illustrating the configuration of an image processing device according to a first embodiment of the invention.

FIG. 1 is a diagram illustrating the configuration of an image processing device according to a first embodiment of the invention. An image processing device 100 according to this embodiment may include an image input unit 11 that receives an input image $P_{in}$. The image processing device 100 may further include a gradation correction value acquiring unit 12 that acquires a gradation correction value $\alpha$ representing a ratio of a luminance component of the input image $P_{in}$ and a luminance component of an output image $P_{out}$. The image processing device 100 may further include a chroma analyzing unit 13 that calculates a chroma correction value $\beta$, in which the total sum of degrees of chroma discrepancy between an analysis image $P_a$ equal to or different from the input image $P_{in}$ and a corrected image $P_b$ obtained by correcting the luminance component of the analysis image $P_a$ on the basis of one or more gradation correction values $\alpha$ is the minimum, in correspondence with the gradation correction value $\alpha$. The image processing device 100 may further include an image output unit 14 that outputs as the output image $P_{out}$ an image obtained by correcting the input image $P_{in}$ received by the image input unit 11 on the basis of the gradation correction value α acquired by the gradation correction value acquiring unit 12 and the chroma correction value β correlated with the gradation correction value α.

The image input unit 11, the gradation correction value acquiring unit 12, and the chroma analyzing unit 13 may be included in a data processing unit 10. The data processing unit 10 appropriately stores processed data or parameters in a storage unit 16. The data processing unit 10 appropriately reads the programs or data stored in the storage unit 16.

All or a part of the configuration of the image processing device 100 may be embodied by hardware or by a program (or program codes) executed by a computer. The computer reads and executes the program from a storage medium such as a nonvolatile memory. In this embodiment, the data processing unit 10 may be embodied by a processor and the storage unit 16 may be embodied by a storage medium.

When the configuration of the image processing device 100 is embodied by a program, the program allows a computer to execute an image input process of receiving an input image $P_{in}$. The program allows the computer to execute a gradation correction value acquiring process of acquiring a gradation correction value α0 representing a ratio of a luminance component of the input image $P_{in}$ and a luminance component of an output image $P_{out}$. The program allows the computer to execute a chroma analyzing process of calculating a chroma correction value β, in which the total sum of degrees of chroma discrepancy between an analysis image $P_a$ equal to or different from the input image $P_{in}$ and a corrected image obtained by correcting a luminance component of the analysis image $P_a$ on the basis of one or more gradation correction values α is the minimum, in correspondence with the gradation correction value α. The program allows the computer to execute an image output process of outputting as the output image $P_{out}$ an image obtained by correcting the input image $P_{in}$ received in the image input process on the basis of the gradation correction value α acquired in the gradation correction value acquiring process and the chroma correction value β correlated with the gradation correction value α.

The image input unit 11 receives an input image $P_{in}$ from an external device (not shown) or an external network (not shown) to which the image processing device 100 is connected. The image input unit 11 transmits an input request for the input image $P_{in}$ to the external device or the external network. The external device or the external network having received the input request inputs the input image $P_{in}$ to the image input unit 11 in response to the input request.

The image input unit 11 sends out the input image $P_{in}$ to the chroma analyzing unit 13. The input image $P_{in}$ sent from the image input unit 11 may be a YUV image which is expressed by a luminance component (a Y component) and a chrominance component (a U component and a V component).

The input image $P_{in}$ input to the image input unit 11 may not be an image such as a YUV image or a YCrCb image which is expressed by a luminance component or a chrominance component. In this case, a transformation process into an image expressed by a luminance component and a chrominance component is not necessary as described above. The input image $P_{in}$ does not have to be subjected to the transformation process, but can be expressed by a luminance component and a chrominance component and can be sent out.

The image processing device 100 may further include an operation input unit 15 that receives a user's input operation. The operation input unit 15 may be embodied in an input type where keys are pressed or in a touch panel type.

A method by which the gradation correction value acquiring unit 12 acquires a gradation correction value α is not particularly limited. For example, the gradation correction value acquiring unit 12 may acquire the gradation correction value α determined as a default from the storage unit 16. Alternatively, the gradation correction value acquiring unit 12 may acquire a value input by the user's input operation through the operation input unit 15 as the gradation correction value α. The gradation correction value α may be calculated on the basis of the value input by the user's input operation through the operation input unit 15 and the data stored in the storage unit 16. The gradation correction value acquiring unit 12 may calculate the gradation correction value α from the luminance component of an output image $P_{out}$ determined as a default and the luminance component of the input image $P_{in}$.

In this embodiment, when a pixel position of a pixel included in the input image $P_{in}$ input to the image input unit 11 is expressed by (x, y), the luminance component of the input image $P_{in}$ is defined as an input luminance value $Y_{in}(x, y)$. The chrominance components of the input image $P_{in}$ are defined as input chrominance values $U_{in}(x, y)$ and $V_{in}(x, y)$.

When a pixel position of a pixel included in the output image $P_{out}$ output from the image output unit 14 is similarly expressed by (x, y), the luminance component of the output image $P_{out}$ is defined as an output luminance value $Y_{out}(x, y)$. The chrominance components of the output image $P_{out}$ are defined as output chrominance values $U_{out}(x, y)$ and $V_{out}(x, y)$.

The relation between the input luminance value $Y_{in}(x, y)$ and the output luminance value $Y_{out}(x, y)$ and the relations between the input chrominance values $U_{in}(x, y)$ and $V_{in}(x, y)$ and the output chrominance values $U_{out}(x, y)$ and $V_{out}(x, y)$ may be expressed by Expression 3.

$$Y\text{out}=\alpha \cdot Y\text{in}$$

$$U\text{out}=\beta \cdot U\text{in}$$

$$V\text{out}=\beta \cdot V\text{in} \qquad \text{Expression 3}$$

Referring to Expression 3, the image output unit 14 sets the luminance component ($Y_{out}(x, y)$) of the output image $P_{out}$ to a value obtained by multiplying the gradation correction value α by the luminance component ($Y_{in}(x, y)$) of the input image $P_{in}$. The image output unit 14 corrects the chrominance components ($U_{out}(x, y)$ and $V_{out}(x, y)$) of the output image $P_{out}$ to values obtained by multiplying the chroma correction value β by the chrominance values ($U_{in}(x, y)$ and $V_{in}(x, y)$) of the input image $P_{in}$.

An example of a process performed by the chroma analyzing unit 13 will be described below.

The chroma analyzing unit 13 calculates a chroma correction value β, in which the total sum of degrees of chroma discrepancy between an analysis image Pa equal to or different from the input image Pin and a corrected image Pb generated by correcting the analysis image Pa on the basis of a gradation correction value a acquired by the gradation correction value acquiring unit 12 is the minimum, in correspondence with the gradation correction value α.

In this embodiment, it is assumed that the chroma analysis unit 13 receives the input image $P_{in}$ input to the image input unit 11 as the analysis image $P_a$.

First, the chroma analyzing unit 13 applies Expression 3 to all or a part of the pixels included in the input image $P_{in}$ (the analysis image $P_a$) to correct the pixels on the basis of the chroma correction value β set as a virtual value and the gradation correction value α acquired by the gradation correction value acquiring unit 12 and generates the corrected image $P_b$. Here, the pixels to be corrected may be all the pixels included in the input image $P_{in}$. However, the processing load of the chroma analyzing unit 13 increases.

Accordingly, the chroma analyzing unit 13 may selectively correct only some representative pixels included in the input image $P_{in}$, thereby reducing the processing load. In this case, the generated corrected image $P_b$ is a set of some corrected pixels.

Then, the chroma analyzing unit 13 may calculate and express the chroma $S_b(x, y)$ of each pixel of the corrected image $P_b$ by the use of chromatics indexes (a* and b*) when the corresponding pixel is transformed into a L*a*b* color space. The chroma analyzing unit 13 may calculate and express the chroma $S_a(x, y)$ of each pixel of the input image $P_{in}$ (the analysis image $P_a$) by the use of the chromatics indexes (a* and b*) when the corresponding pixel is transformed into the L*a*b* color space.

In this embodiment, the chroma analyzing unit 13 expresses the chroma by the use of the chromatics indexes of the L*a*b* color space, but is not limited to this configuration. Here, it is preferable that the chroma is expressed by the use of an isochromatic space in which inter-color distances in a color space approximates to human sense differences in color.

The chroma analyzing unit 13 expresses the degree of chroma discrepancy in each pixel as $(S_b(x, y)-S_a(x, y))^2$ and calculates the total sum $\Sigma(S_b(x, y)-S_a(x, y))^2$ of the degrees of chroma discrepancy in all the corrected pixels.

The chroma analyzing unit 13 calculates the total sums $\Sigma(S_b(x, y)-S_a(x, y))^2$ of the degrees of chroma discrepancy for each chroma correction value β while changing the value of the chroma correction value β, and determines the value of β in which the total sum $\Sigma(S_b(x, y)-S_a(x, y))^2$ of the degrees of separation is the minimum by comparison. At the time of determining the chroma correction value β in this way, the number of pixels to be corrected by the chroma analyzing unit 13 needs to be constant even when the value of the chroma correction value β is changed.

The chroma analyzing unit 13 transmits the chroma correction value β calculated by the above-mentioned method to the image output unit 14 in correspondence with the gradation correction value α.

Figure 2:
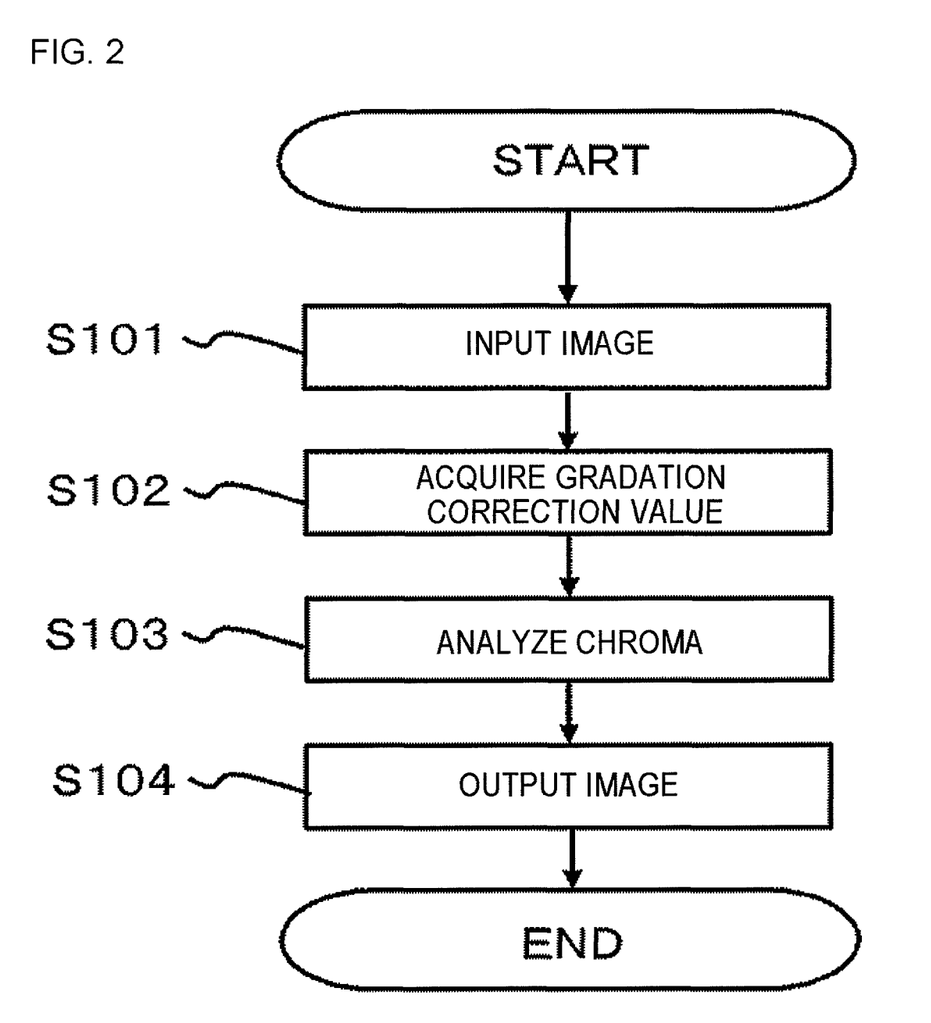
FIG. 2 is a flow diagram illustrating an image processing method according to the first embodiment of the invention.

An image processing method according to this embodiment will be described below. FIG. 2 is a flow diagram illustrating the image processing method according to this embodiment.

The image processing method according to this embodiment includes an image input step (step S101) of receiving an input image $P_{in}$. The image processing method according to this embodiment includes a gradation correction value acquiring step (step S102) of acquiring a gradation correction value α representing a ratio of the luminance component of the input image $P_{in}$ and the luminance component of the output image $P_{out}$. The image processing method according to this embodiment includes a chroma analyzing step (step S103) of calculating a chroma correction value β, in which the total sum of degrees of chroma discrepancy between the analysis image $P_a$ equal to or different from the input image $P_{in}$ and the corrected image $P_b$ obtained by correcting the luminance component of the analysis image $P_a$ on the basis of one or more gradation correction values α is the minimum, in correspondence with the corresponding gradation correction value α. The image processing method according to this embodiment includes an image output step (step S104) of outputting as the output image $P_{out}$ an image obtained by correcting the input image $P_{in}$ received in the image input step (step S101) on the basis of the gradation correction value α acquired in the gradation correction value acquiring step (step S102) and the chroma correction value β correlated with the gradation correction value α.

Advantages of this embodiment will be described. In this embodiment, it is possible to calculate the chroma correction value β corresponding to a specific gradation correction value α, by analyzing the input image $P_{in}$ (the analysis image $P_a$) and the corrected image $P_b$ obtained by correcting the input image $P_{in}$ (the analysis image $P_a$) on the basis of the specific gradation correction value α.

In Patent Document 4, the correlation between a gain of the luminance component and a gain of the chroma (gains of the chrominance components) is found and the gain of the chroma (the gains of the chrominance components) is estimated from the gain of the luminance component. However, since the approximation value is calculated by the linear approximation by paying attention to the overall area in which the value of the luminance component is in the range of 30 to 200, the error may be great depending on the values of the luminance component.

In comparison, in this embodiment, since the chroma correction value β (the gains of the chrominance components) is calculated by paying attention to one point of a specific gradation correction value α (the gain of the luminance component), it is possible to correct the chroma with relatively high accuracy.

In the image processing device 100 according to this embodiment, since the chroma correction value β is calculated using the input image $P_{in}$ received by the image input unit 11 as the analysis image $P_a$, it is possible to appropriately correct the chroma even without using statistical measured values.

Second Embodiment

Figure 3:
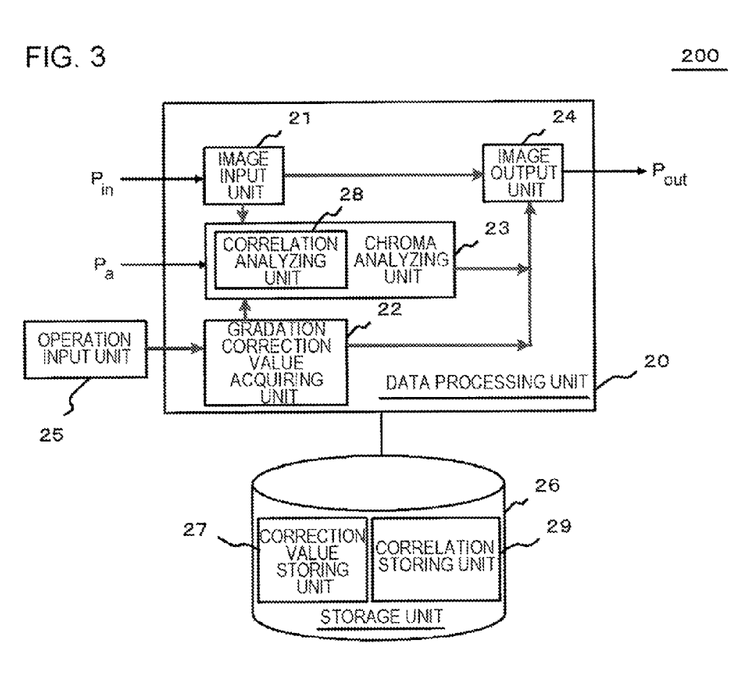
FIG. 3 is a diagram illustrating the configuration of an image processing device according to a second embodiment of the invention.

FIG. 3 is a diagram illustrating the configuration of an image processing device according to a second embodiment of the invention. An image input unit 21, a gradation correction value acquiring unit 22, and an operation input unit 25 included in the image processing device 200 according to this embodiment are the same as the image input unit 11, the gradation correction value acquiring unit 12, and the operation input unit 15 described in the first embodiment.

The image input unit 21 and the gradation correction value acquiring unit 22 may be included in a data processing unit 20. The data processing unit 20 appropriately stores processed data, parameters, or the like in a storage unit 26. The data processing unit 20 may appropriately read programs, data, or the like stored in the storage unit 26.

In this embodiment, it is assumed that a chroma analyzing unit 23 receives an image different from the input image $P_{in}$ received by the image input unit 21 as the analysis image $P_a$. Specifically, the chroma analysis unit 23 receives a learning image as the analysis image $P_a$, and stores gradation correction values α and chroma correction values β in advance in the storage unit 26 in correspondence with each other.

The image processing device 200 may further include a correction value storing unit 27 that stores one or more gradation correction values α used in correcting the analysis image $P_a$ and the chroma correction values β correlated with the corresponding gradation correction values, in addition to the constituent elements of the image processing device 100 according to the first embodiment.

The correction value storing unit 27 may be embodied as a storage area of the storage unit 26.

The gradation correction value acquiring unit 22 may acquire one of the gradation correction values α stored in the correction value storing unit 27.

The image output unit 24 acquires the chroma correction value β correlated with the gradation correction value α acquired by the gradation correction value acquiring unit 22 from the correction value storing unit 27. The image output unit 24 outputs an image obtained by correcting the input image $P_{in}$ on the basis of the acquired gradation correction value α and the acquired chroma correction value β as the output image $P_{out}$.

Figure 4:
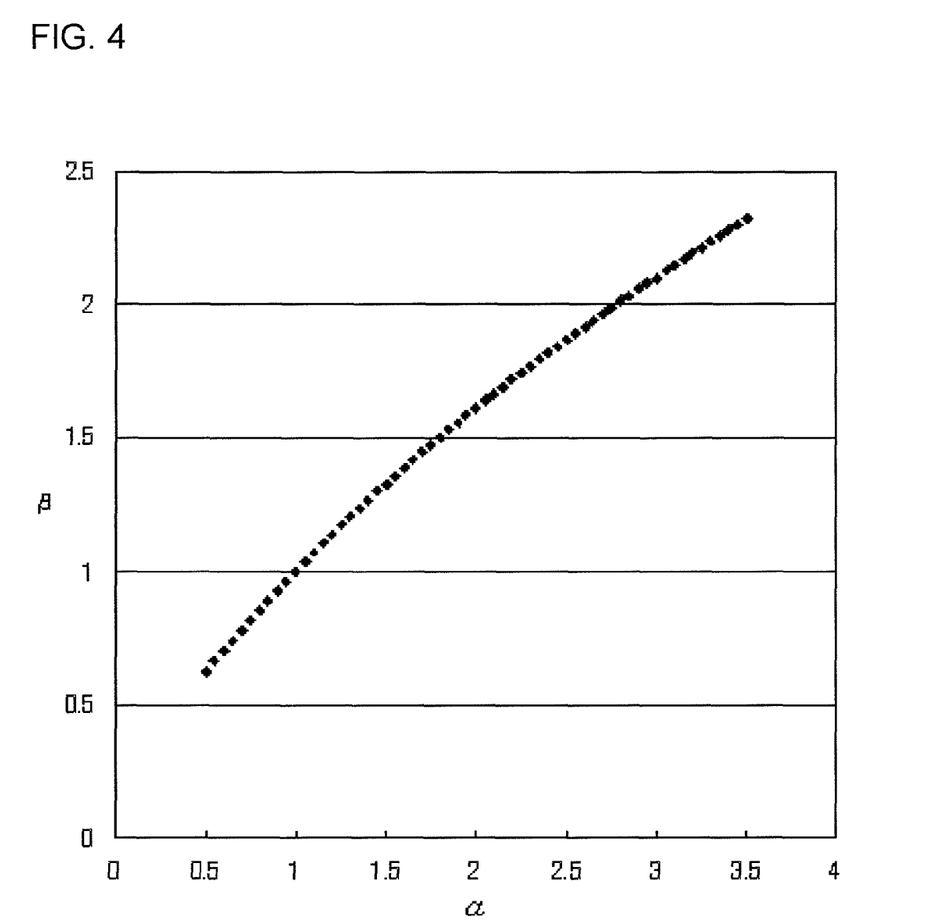
FIG. 4 is a diagram illustrating the distribution of a gradation correction value $\alpha$ and a chroma correction value $\beta$ stored in a storage unit.

FIG. 4 is a diagram illustrating a distribution of the gradation correction values α and the chroma correction values β stored in the correction value storing unit 27. In the distribution, the horizontal axis represents the gradation correction values α and the vertical axis represents the chroma correction values β. In FIG. 4, the gradation correction value α is discretely changed from 0.5 to 3.5 in the units of 0.05. The chroma correction values β are calculated by applying the method used by the chroma analyzing unit 13 according to the first embodiment to the gradation correction values α. In FIG. 4, the gradation correction value α and the chroma correction value β correlated with each other are expressed as one point.

As described above, when the correction value storing unit 27 stores plural gradation correction values α and plural chroma correction values β, the image processing device 200 may include the following constituent elements.

The image processing device 200 may further include a correlation analyzing unit 28 that analyzes the correlation between plural sets of gradation correction value α and chroma correction value β stored in the correction value storing unit 27. The image processing device 200 may further include a correlation storing unit 29 that stores the correlation.

In this case, the image output unit 24 may acquire the correlation from the correlation storing unit 29 and may apply the correlation to the gradation correction value α acquired by the gradation correction value acquiring unit 22 to acquire the chroma correction value β. The "chroma correction value β correlated with the gradation correction value α" may include the chroma correction value β obtained by applying a correlation equation to the gradation correction value α acquired by the gradation correction value acquiring unit 22 as in this embodiment.

The correlation storing unit 29 may be embodied as a storage area of the storage unit 26.

Figure 5:
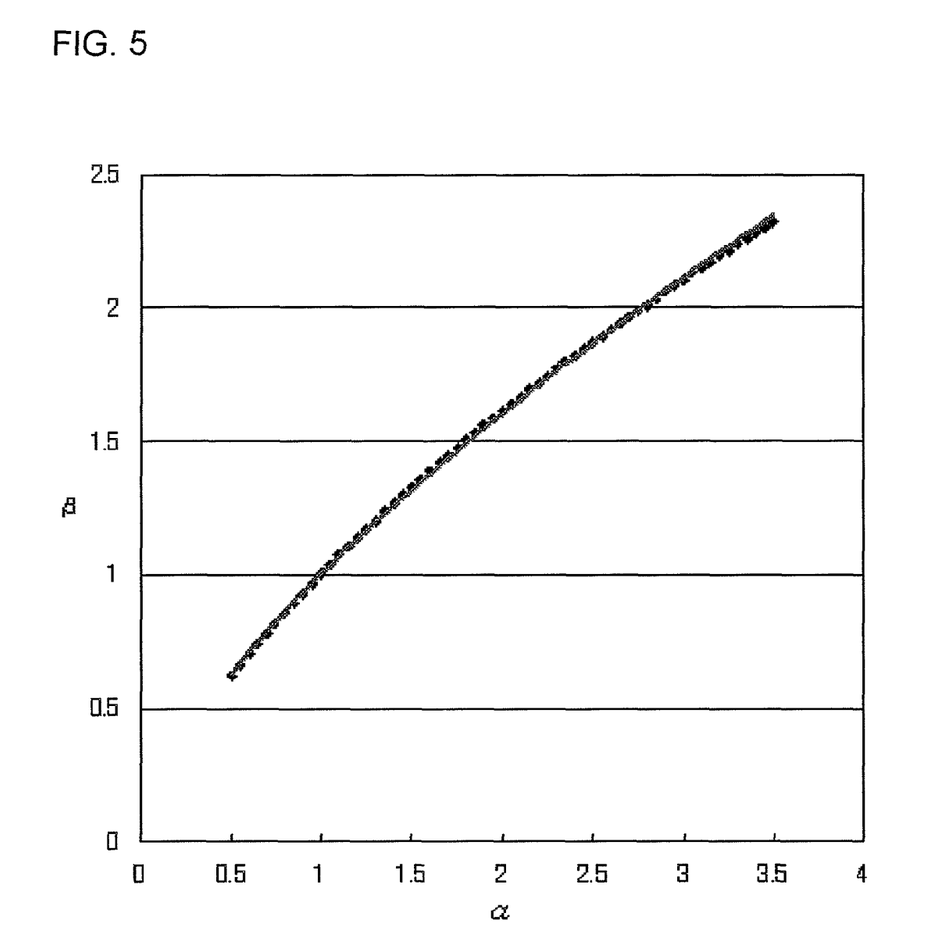
FIG. 5 is a diagram illustrating together the plot shown in FIG. 4 and an approximation curve in which the plot is interpolated.

An analysis process performed by the correlation analyzing unit 28 will be described below. FIG. 5 is a diagram illustrating the plot shown in FIG. 4 and an approximation curve interpolating the plot together. The approximation curve is obtained by exponential approximation. Expression 4 is a correlation equation representing the approximation curve.

$$Uout(x, y) = \left(\frac{Yout(x, y)}{Yin(x, y)}\right)^q Uin(x, y)$$

$$Vout(x, y) = \left(\frac{Yout(x, y)}{Yin(x, y)}\right)^q Vin(x, y)$$

Expression 4

In Expression 4, q may be arbitrarily determined in the range of 0<q<1 by a user. The value of q may be determined by the input operation received by the operation input unit 15. In the approximation curve shown in FIG. 5, q=0.68 is set.

When q=0 is set, Expression 4 becomes equal to Expression 1. When q=1 is set, the image processing device 100 does not correct the input image $P_{in}$.

The concept of the analysis process performed by the correlation analyzing unit 28 has been described above. The correlation analyzing unit 28 need not actually prepare the diagram shown in FIG. 4 or 5. The correlation analyzing unit 28 has only to calculate the correlation equation (Expression 4) representing the correlation by the exponential approximation using α and β stored in the storage unit 26.

The chroma analyzing unit 23, the image output unit 24, and the correlation analyzing unit 28 may be included in the data processing unit 20. The correlation analyzing unit 28 may be included in the chroma analyzing unit 23.

Figure 6:
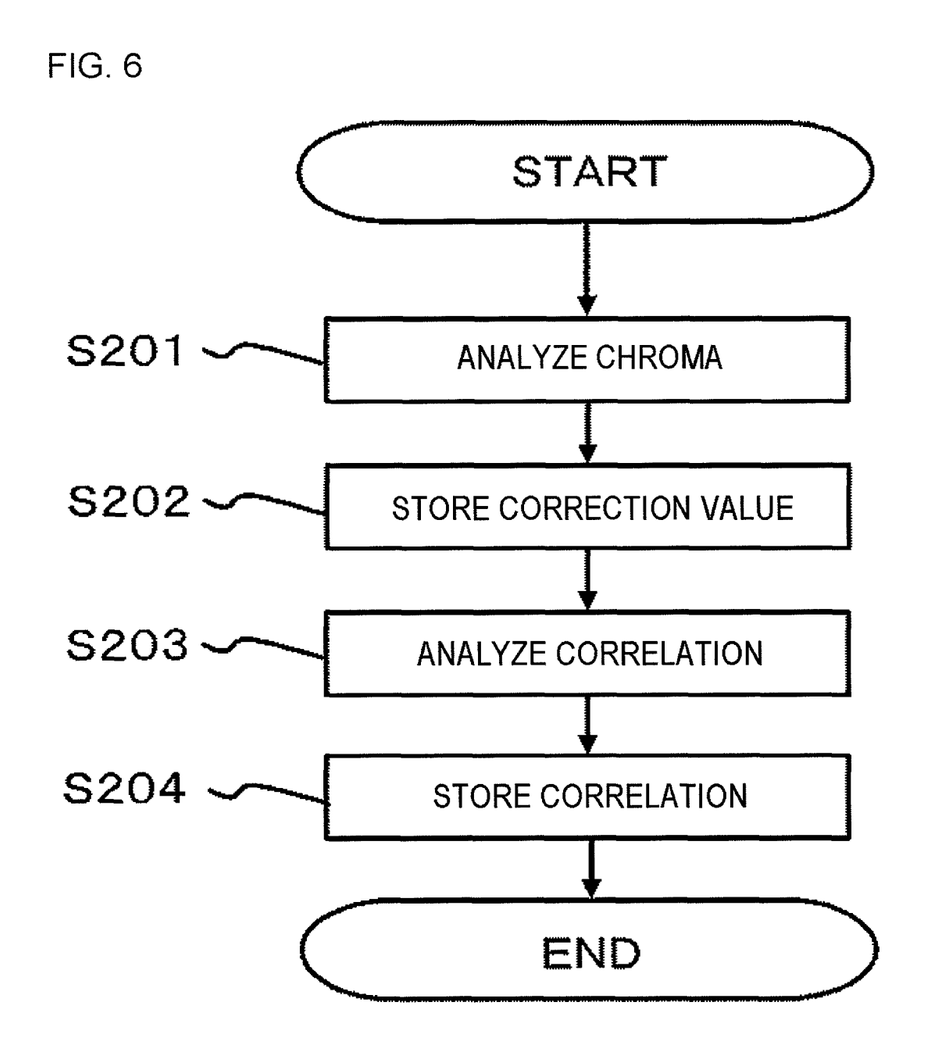
FIG. 6 is a flow diagram illustrating a preliminary process in an image processing method according to the second embodiment of the invention.

FIG. 6 is a flow diagram illustrating a preliminary process of the image processing method according to this embodiment. Here, the preliminary process means a process of receiving a learing image as the analysis image $P_a$ and storing the gradation correction values α and the chroma correction values β in the storage unit 26 in correspondence with each other in advance.

In the image processing method according to this embodiment, a learning image (an image different from the input image $P_{in}$ received in the image input step) is received as the analysis image $P_a$ in the chroma analysis step (step S201). The process on the analysis image $P_a$ in the chroma analyzing step (step S201) is the same as the chroma analyzing step (step S103) and the chroma correction value β may be acquired using the method described in the first embodiment.

The image processing method according to this embodiment may further include a correction value storing step (S202) of storing one or more gradation correction values α used in correcting the analysis image $P_a$ in the chroma analyzing step (S201) and the chroma correction value β correlated with the gradation correction values α.

The image processing method according to this embodiment may further include a correlation analyzing step (step S203) of analyzing the correlation between plural sets of gradation correction value α and chroma correction value β stored in the storage unit 26 (the correction value storing unit 27) and a correlation storing step (step S204) of storing the correlation in the storage unit 26 (the correlation storing unit 29).

Figure 7:
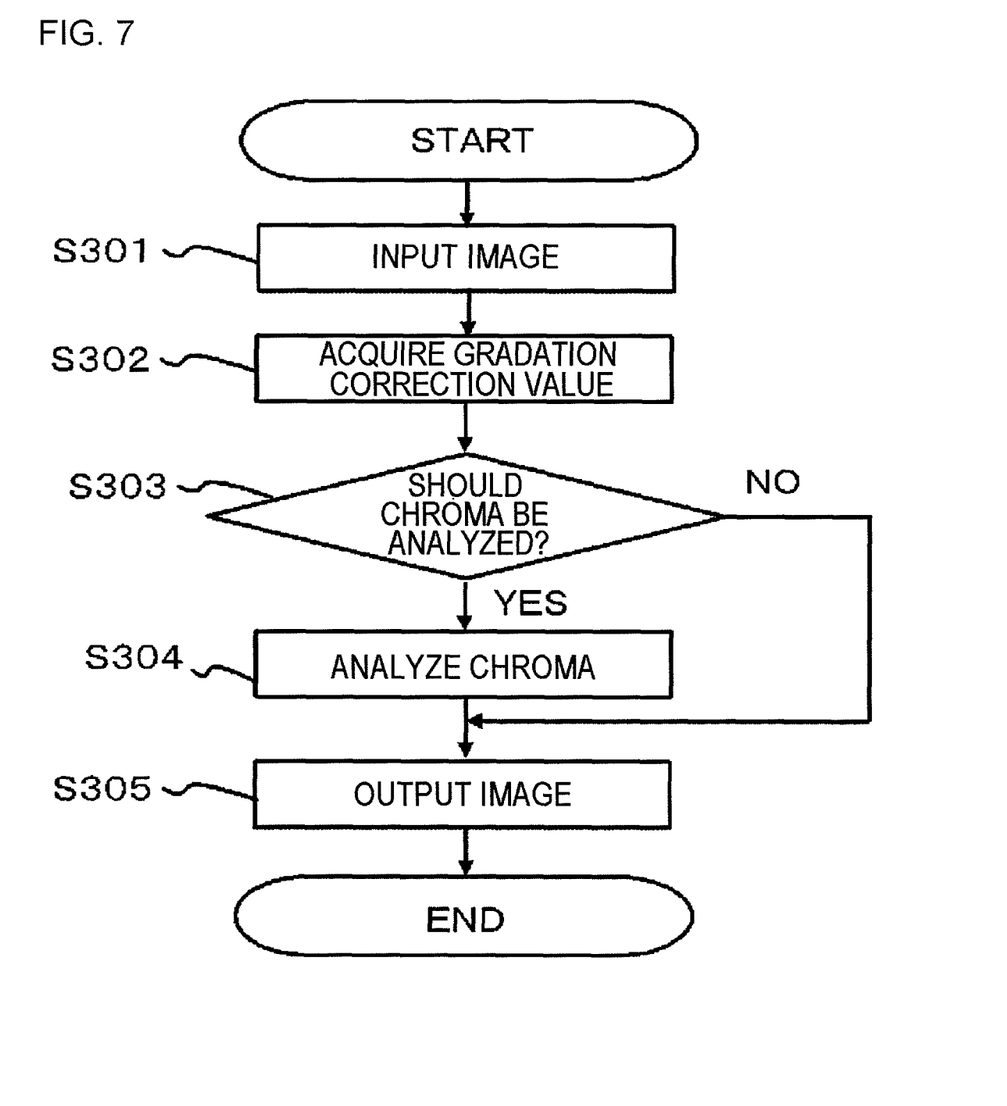
FIG. 7 is a flow diagram illustrating a post process in the image processing method according to the second embodiment of the invention.

FIG. 7 is a flow diagram illustrating a post process in the image processing method according to this embodiment. Here, the post process means a process of correcting the input image $P_{in}$ using the gradation correction values α and the chroma correction values β stored in advance in the storage unit 26 or the correlation thereof and outputting the output image $P_{out}$.

The image processing method according to this embodiment may further include an image input step (step S301). Here, the image input step (step S301) is the same step as the image input step (step S101) in the first embodiment.

In the image processing method according to this embodiment, one of the gradation correction values α stored in the storage unit 26 (the correction value storing unit 27) in the gradation correction value acquiring step (step S302). In the image output step (step S305), the chroma correction value β correlated with the gradation correction value α acquired in the gradation correction value acquiring step (step S302) may be acquired from the storage unit 26 (the correction value storing unit 27).

In the image output step (step S305) of the image processing method according to this embodiment, the correlation may be acquired from the storage unit 26 (the correlation value storing unit 29) and the correlation may be applied to the gradation correction value α acquired in the gradation correction value acquiring step (step S302) to acquire the chroma correction value β.

In the image processing method according to this embodiment, the gradation correction value α and the chroma correction value β can be acquired or calculated from the data stored in the storage unit 26 without performing the chroma analysis. Accordingly, when the chroma analysis is not performed (NO in step S303), the image output step (step S305) is performed instead of performing the chroma analyzing step (step S304).

When the chroma analysis is performed by a user's request or the like (YES in step S303), the chroma analyzing step (step S304) may be performed. In this case, the chroma analyzing step (step S304) and the image output step (step S305) are the same steps as the chroma analyzing step (step S103) and the image output step (step S104) described in the first embodiment, respectively.

Advantages of the image processing device 200 according to this embodiment will be described below. The image processing device 200 according to this embodiment can receive a learning image as the analysis image $P_a$ and store the acquired gradation correction value α the chroma correction value β acquired from the leaning image in the storage unit 26 in correspondence with each other in advance. Since the image output unit 24 uses the gradation correction values α and the chroma correction values stored in the storage unit 26, it is possible to reduce the processing load until the output image $P_{out}$ is output after the input image $P_{in}$ is received.

The image processing device 200 according to this embodiment can analyze the correlation between the plural sets of gradation correction value α and chroma correction value β stored in the storage unit 26 and apply the correlation (correction equation) to the acquired gradation correction value α to acquire the chroma correction value β. Accordingly, it is possible to perform the gradation correcting operation using the gradation correction value α not stored in the storage unit 26.

As can be seen from FIG. 4 or 5, β/α decreases with the increase in value of α and β/α increases with the decrease in value of α. Accordingly, the correlation equation representing the correlation between α and β is preferably obtained by the exponential approximation of which the approximation curve is a curve.

Figure 8:
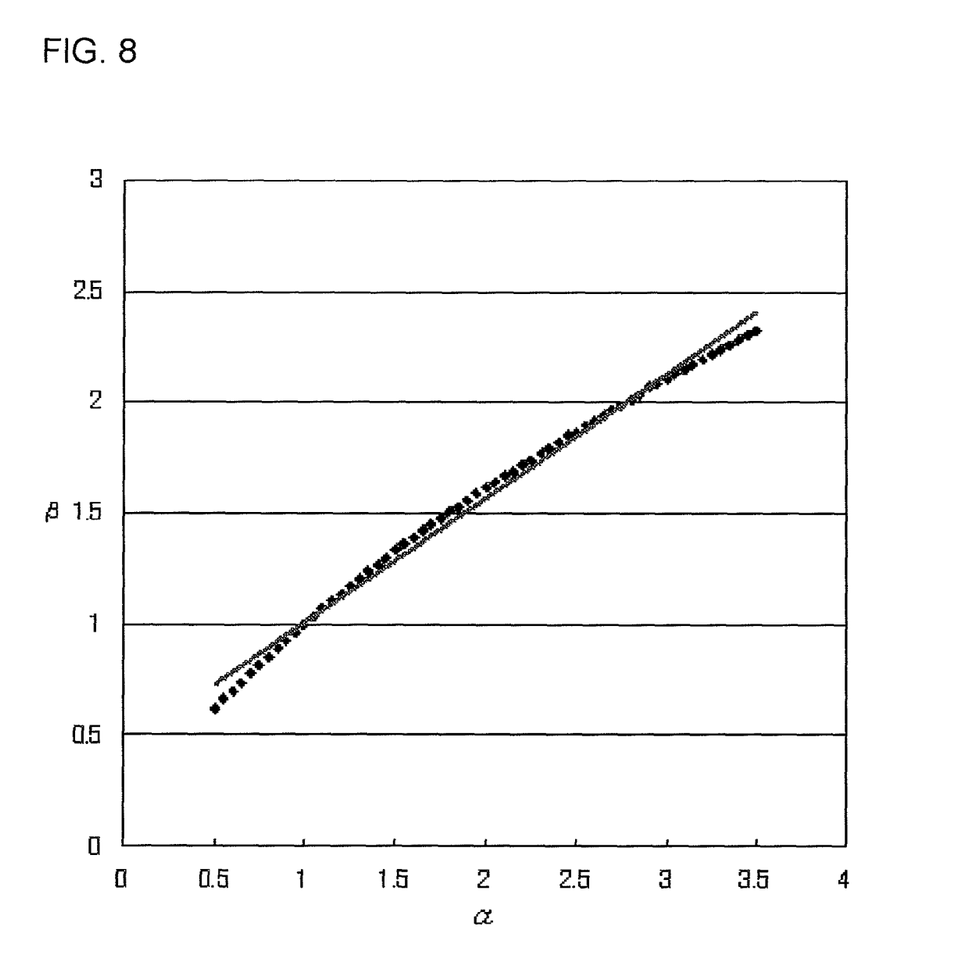
FIG. 8 is a diagram illustrating a straight line represented by an approximation equation used in Patent Document 4, which is superposed on FIG. 4.

In the correlation equation representing a straight line like Expression 1 or Expression 2, the error thereof increases when the value of α is small or great. FIG. 8 is a diagram illustrating the straight line represented by Expression 2 to overlap with FIG. 4. It can be seen from FIG. 8 that the error increases when the value of α is small or great.

That is, Expression 4 can be more appropriately used as the expression representing the correlation between α and β in comparison with Expression 1 or Expression 2. Accordingly, the image processing device 200 according to this embodiment can more appropriately perform the chroma correcting operation than the technique described in Patent Document 3 or Patent Document 4 using the approximation equation (Expression 4).

While the embodiments of the invention have been described with reference to the accompanying drawings, the embodiments are only examples of the invention and various configurations other than the above-mentioned configurations may be employed.

For example, the input image $P_{in}$ sent from the image input unit 11 has only to be expressed by a luminance component and a chrominance component. Accordingly, although it has been described in the above-mentioned embodiments that the input image $P_{in}$ sent from the image input unit 11 is a YUV image, the input image may be a YCrCb image in a modified example.

Although it has been described in the above-mentioned embodiments of the invention that the chroma analysis unit 13 acquires the value of the chroma correction value β so as to minimize the total sum $\Sigma(S_b(x, y)-S_a(x, y))^2$ of the degrees of chroma discrepancy, the invention is not limited to this method. In a modified example, the value of the chroma correction value β may be determined so as to minimize the root mean square of chroma deviation $\Sigma(S_b(x, y)-S_a(x, y))^2/N$. Here, N represents the number of pixels of the corrected image $P_b$. At the time of determining the chroma correction value β in this way, it is not necessary to keep the number of pixels to be corrected by the chroma analyzing unit 13 constant even when the determined value of the chroma correction value β is changed.

In the above-mentioned embodiments of the invention, with the definition of Expression 3, the image output unit 14 (or the image output unit 24) sets the value obtained by multiplying the gradation correction value α by the luminance component of the input image $P_{in}$ as the luminance component of the output image $P_{out}$ and sets the value obtained by multiplying the chroma correction value β by the chrominance component of the input image $P_{in}$ as the chrominance component of the output image $P_{out}$. However, the invention is not limited to this configuration.

For example, the image output unit 14 (or the image output unit 24) may set a value obtained by adding the gradation correction value α to the luminance component of the input image $P_{in}$ as the luminance component of the output image $P_{out}$. The image output unit 14 (or the image output unit 24) may set a value obtained by adding the chroma correction value β to the chrominance component of the input image $P_{in}$ as the chrominance component of the output image $P_{out}$. This can be expressed by Expression 5.

$$U\text{out}(x,y)=(Y\text{out}(x,y)-Y\text{in}(x,y))^{q'}U\text{in}(x,y)$$

$$V\text{out}(x,y)=(Y\text{out}(x,y)-Y\text{in}(x,y))^{q'}V\text{in}(x,y) \qquad \text{Expression 5}$$

In expression 5, q' may be arbitrarily determined in the range of 0<q'<1 by a user. The value of q' may be determined by the input operation received by the operation input unit 15 (or the operation input unit 25).

In a modified example of the invention, at least one of the correction value storing unit 27 and the correlation storing unit 29 may be embodied by a memory device other than the storage unit 26.

The image processing device 100 (or the image processing device 200) may employ a reverse correction technique so as to improve the visibility. Details thereof will be described below.

The image processing device 100 may calculate peripheral luminance values $Y_{ave}(x, y)$ representing the brightness of a peripheral area of each pixel at pixel positions (x, y) included in the input image $P_{in}$ received by the image input unit 11. Expressions 6, 7, and 8 associated with this calculation are described below.

$$Y\text{ave}(x, y) = Y\text{in}(s, t) * H(x, y, s, t) \qquad \text{Expression 6}$$

$$H(x, y, s, t) = K\exp\left(-\frac{(s-x)^2}{2\sigma^2} - \frac{(t-y)^2}{2\sigma^2}\right) \qquad \text{Expression 7}$$

$$\sum_{s,t} H(x, y, s, t) = 1 \qquad \text{Expression 8}$$

Here, the operator * represents a convolution operation. H(x, y, s, t) represents an isotropic two-dimensional normal distribution centered on the pixel position (x, y) and satisfies Expressions 7 and 8.

The peripheral luminance value in $Y_{ave}(x, y)$ expressed Expression 6 is a weighted addition of the luminance components of the peripheral area of the pixel position $(x, y)$ and means that the pixel position $(x, y)$ is included in a brighter area as the peripheral luminance value $Y_{ave}(x, y)$ becomes larger.

As a method of calculating the peripheral luminance value $Y_{ave}(x, y)$, a method of discretely calculating the peripheral luminance values at certain intervals using Expression 6 and calculating the peripheral luminance values of the pixel positions therebetween by linear interpolation or bicubic interpolation may be employed.

The image output unit 14 performs the gradation correcting process on the luminance components $Y_{in}(x, y)$ and $Y_{ave}(x, y)$ of the input image $P_{in}$ and calculates the luminance component $Y_{out}(x, y)$ of the output image $P_{out}$. An example of the method of calculating $Y_{out}(x, y)$ is expressed by Expression 9. Here, $Y_{max}$ represents the maximum value of $Y_{out}(x, y)$. $L(x, y)$ is a value calculated on the basis of the peripheral luminance values $Y_{ave}(x, y)$ of the pixel position $(x, y)$ and is set so as to increase close to 1.0 as $Y_{ave}(x, y)$ increases and to decrease close to a predetermined value minL (where 0<minL<1) as $Y_{ave}(x, y)$ decreases. An example of a method of calculating $L(x, y)$ is expressed by Expression 10. Here, maxAve and minAve are predetermined values and satisfy Ymax>maxAv>minAv>0.

$$Yout(x, y) = Y\max\left(1 - \left(\frac{Y\max - Yin(x, y)}{Y\max}\right)^{1/L(x,y)}\right) \quad \text{Expression 9}$$

$$L(x, y) = \quad \text{Expression 10}$$
$$\begin{cases} 1.0 & Yave(x, y) > maxAve \\ \frac{(1 - minL)Yave(x, y)}{maxAve - minAve} + \frac{minL \cdot maxAve - minAve}{maxAve - minAve} & maxAve \geq Yave(x, y) \geq minAve \\ minL & Yave(x, y) < minAve \end{cases}$$

A back light correcting operation using Expressions 9 and 10 will be described below. When $Y_{ave}(x, y)$ is sufficiently large ($Y_{ave}(x, y)$>maxAve), that is, when the pixel position $(x, y)$ is included in a sufficiently bright area, $L(x, y)=1.0$ is obtained and thus $Y_{out}(x, y)=Y_{in}(x, y)$ is obtained. When $Y_{ave}(x, y)$ decreases, that is, when the area including the pixel of the pixel position $(x, y)$ becomes darker, $L(x, y)$ decreases. As $L(x, y)$ decreases, the value of $Y_{out}(x, y)$ with respect to a particularly small value of $Y_{in}(x, y)$ increases and a stronger gradation correcting operation is performed.

Naturally, the above-mentioned embodiments and the above-mentioned modified examples can be combined, as long as the details are not contrary to each other. Although the functions of the constituent elements in the above-mentioned embodiments and the above-mentioned modified examples have been specifically described, the functions can be modified in various forms without departing from the scope of the invention.

This application claims the priority based on Japanese Patent Application No. 2008-334911 (filed Dec. 26, 2008), the contents of which are incorporated herein by reference.

The invention claimed is:

1. An image processing device comprising:
an image input unit that receives an input image;
a gradation correction value acquiring unit that acquires a gradation correction value representing a ratio of a luminance component of said input image and a luminance component of an output image;
a chroma analyzing unit, implemented by a hardware processor, that generates a plurality corrected images, each of the corrected images generated by correcting an analysis image that is same as or different from said input image using one or more gradation correction values and a respective one of plurality of chroma correction values, and determines an output image chroma correction value by calculating for each of the corrected images, a total sum of degrees of chroma discrepancy between said analysis image and respective one of the corrected images, and specifying a chroma correction value, among the plurality of chroma correction values, corresponding to which the total sum of degrees of chroma discrepancy between said analysis image and the respective corrected image is minimum, as the output image chroma correction value;
an image output unit that outputs as said output image an image obtained by correcting said input image received by said image input unit on the basis of said gradation correction value acquired by said gradation correction value acquiring unit and said output image chroma correction value correlated with said gradation correction value; and
a storage unit that stores the one or more gradation correction values used in correcting said analysis image and said chroma correction values correlated with said one or more gradation correction values;
a correlation analyzing unit that analyzes a correlation between a plurality of sets of said one or more gradation correction values and said chroma correction values stored in said storage unit; and
a correlation storing unit that stores said correlation,
wherein said chroma analyzing unit receives an image different from said input image received by said image input unit as said analysis image,
wherein said gradation correction value acquiring unit acquires one of said gradation correction values stored in said storage unit,
wherein said image output unit acquires said chroma correction value correlated with said gradation correction value acquired by said gradation correction value acquiring unit from said storage unit,
wherein said image output unit acquires said correlation from said correlation storing unit and applies said correlation to said gradation correction value acquired by said gradation correction value acquiring unit to calculate said chroma correction value and
wherein said correlation analyzing unit calculates a correlation equation expressing said correlation by exponential approximation.

2. The image processing device as set forth in claim 1, wherein said chroma analyzing unit receives said input image received by said image input unit as said analysis image.

3. The image processing device as set forth in claim 1, wherein said image output unit sets a value obtained by multiplying said gradation correction value by the luminance component of said input image as the luminance component of said output image, and sets a value obtained by multiplying said chroma correction value by a chrominance component of said input image as a chrominance component of said output image.

4. The image processing device as set forth in claim 1, wherein said image output unit sets a value obtained by adding said gradation correction value to the luminance component of said input image as the luminance component of said output image, and sets a value obtained by adding said chroma correction value to a chrominance component of said input image as a chrominance component of said output image.

5. An image processing method comprising:
receiving an input image;
acquiring a gradation correction value representing a ratio of a luminance component of said input image and a luminance component of an output image;
generating a plurality corrected images, each of the corrected images generated by correcting an analysis image that is same as or different from said input image using one or more gradation correction values and a respective one of plurality of chroma correction values,
determining an output image chroma correction value by:
calculating, for each of the corrected images, a total sum of degrees of chroma discrepancy between said analysis image and respective one of the corrected images, and
specifying a chroma correction value, among the plurality of chroma correction values, corresponding to which the total sum of degrees of chroma discrepancy between said analysis image and the respective corrected image is minimum, as the output image chroma correction value; and
outputting as said output image an image obtained by correcting said input image received in said receiving the input image on the basis of said gradation correction value acquired in said acquiring the gradation correction value and said output image chroma correction value correlated with said gradation correction value,
wherein said calculating the chroma correction value includes receiving an image different from said input image received in said receiving the input image as said analysis image,
wherein the image processing method further comprises storing the one or more gradation correction values used in correcting said analysis image and said chroma correction value correlated with said gradation correction values in a storage unit,
wherein said acquiring the gradation correction value includes acquiring one of said gradation correction values stored in said storage unit,
wherein said receiving the input image includes acquiring said chroma correction value correlated with said gradation correction value acquired in said acquiring the gradation correction value from said storage unit,
wherein the image processing method further comprises:
analyzing a correlation between a plurality of sets of said gradation correction values and said chroma correction values stored in said storage unit; and
storing said correlation in said storage unit,
wherein said outputting the output image includes acquiring said correlation from said storage unit and applying said correlation to said gradation correction value acquired in said acquiring the gradation correction value to calculate said chroma correction value,
wherein said analyzing the correlation includes calculating a correlation equation expressing said correlation by exponential approximation.

6. The image processing method as set forth in claim 5, wherein said calculating the chroma correction value includes receiving said input image received in said receiving the input image as said analysis image.

7. The image processing method as set forth in claim 5, wherein said outputting the output image includes setting a value obtained by multiplying said gradation correction value by the luminance component of said input image as the luminance component of said output image, and
setting a value obtained by multiplying said chroma correction value by a chrominance component of said input image as a chrominance component of said output image.

8. The image processing method as set forth in claim 5, wherein said outputting the output image includes
setting a value obtained by adding said gradation correction value to the luminance component of said input image as the luminance component of said output image, and
setting a value obtained by adding said chroma correction value to a chrominance component of said input image as a chrominance component of said output image.

9. A non-transitory computer-readable storage medium having stored thereon a program allowing a computer to execute:
an image input process of receiving an input image;
a gradation correction value acquiring process of acquiring a gradation correction value representing a ratio of a luminance component of said input image and a luminance component of an output image;
a chroma analyzing process of generating a plurality corrected images, each of the corrected images generated by correcting an analysis image that is same as or different from said input image using one or more gradation correction values and a respective one of plurality of chroma correction values, and determining an output image chroma correction value by:
calculating for each of the corrected images, a total sum of degrees of chroma discrepancy between said analysis image and respective one of the corrected images, and
specifying a chroma correction value, among the plurality of chroma correction values, corresponding to which the total sum of degrees of chroma discrepancy between said analysis image and the respective corrected image is minimum, as the output image chroma correction value;
an image output process of outputting as said output image an image obtained by correcting said input image received in said image input process on the basis of said gradation correction value acquired in said gradation correction value acquiring process and said output image chroma correction value correlated with said gradation correction value;
a storing process of storing the one or more gradation correction values used in correcting said analysis image and said chroma correction value correlated with said gradation correction values in a storage unit;
an analyzing process of analyzing a correlation between a plurality of sets of said gradation correction values and said chroma correction values stored in said storage unit; and
a storing process of storing said correlation in said storage unit,
wherein said calculating the chroma correction value includes receiving an image different from said input image received in said receiving the input image as said analysis image,
wherein said acquiring the gradation correction value includes acquiring one of said gradation correction values stored in said storage unit,
wherein said receiving the input image includes acquiring said chroma correction value correlated with said gradation correction value acquired in said acquiring the gradation correction value from said storage unit, and wherein said outputting the output image includes acquiring said correlation from said storage unit and applying said correlation to said gradation correction value acquired in said acquiring the gradation correction value to calculate said chroma correction value, wherein said analyzing the correlation includes calculating a correlation equation expressing said correlation by exponential approximation.

* * * * *

UNITED STATES PATENT AND TRADEMARK OFFICE
CERTIFICATE OF CORRECTION

PATENT NO. : 8,891,865 B2
APPLICATION NO. : 13/142211
DATED : November 18, 2014
INVENTOR(S) : Masato Toda It is certified that error appears in the above-identified patent and that said Letters Patent is hereby corrected as shown below:

In the Specification

Column 5, Line 25: Delete "α0" and insert -- $\alpha$ --

Column 6, Line 53: Delete "Pa" and insert -- $P_a$ --

Column 6, Line 54: Delete "Pin" and insert -- $P_{in}$ --

Column 6, Line 54: Delete "Pb" and insert -- $P_b$ --

Column 6, Line 55: Delete "Pa" and insert -- $P_a$ --

Column 6, Line 56: Delete "a" and insert -- $\alpha$ --

Column 11, Line 22: After "α" insert -- and --

Column 13, Line 1: After "value" delete "in"

Column 13, Line 1: After "expressed" insert -- in --

Signed and Sealed this
Sixteenth Day of June, 2015

Michelle K. Lee
*Director of the United States Patent and Trademark Office*